United States Patent [19]

Honda et al.

[11] Patent Number: 4,600,627
[45] Date of Patent: Jul. 15, 1986

[54] SANDWICH GLASSES

[75] Inventors: Toshio Honda, Akigawa; Itsuo Tanuma, Sayama; Hideo Takeichi, Tanashi; Hiromi Oturu, Akigawa; Yasuhiro Morimura, Kunitachi, all of Japan

[73] Assignee: Bridgstone Corporation, Tokyo, Japan

[21] Appl. No.: 724,741

[22] Filed: Apr. 18, 1985

[30] Foreign Application Priority Data

Apr. 24, 1984 [JP] Japan ................................. 59-81172
Apr. 24, 1984 [JP] Japan ................................. 59-81173

[51] Int. Cl.$^4$ ............................ B32B 3/00; B32B 7/14
[52] U.S. Cl. ..................................... 428/203; 428/204; 428/209; 428/210; 428/441; 428/442; 428/461; 428/463; 428/702
[58] Field of Search ............... 428/442, 203, 209, 210, 428/426, 441, 702, 204, 461, 463

[56] References Cited

U.S. PATENT DOCUMENTS

| | | | |
|---|---|---|---|
| 4,303,739 | 12/1981 | Beckmann et al. | 428/442 |
| 4,317,862 | 3/1982 | Honda et al. | 428/442 |
| 4,511,627 | 4/1985 | Tanuma et al. | 428/442 |

*Primary Examiner*—George F. Lesmes
*Assistant Examiner*—P. R. Schwartz
*Attorney, Agent, or Firm*—Sughrue, Mion, Zinn, Macpeak, and Seas

[57] ABSTRACT

A sandwich glass having excellent safety, durability, scuff resistance and penetration resistance is disclosed, which comprises two glass plates and a laminate interposed therebetween. This laminate consists of at least two intermediate layers composed of a crosslinking type polymer composition, and an organic resin film layer interposed between the intermediate layers.

7 Claims, No Drawings

SANDWICH GLASSES

BACKGROUND OF THE INVENTION

1. Field of the Invention

This invention relates to sandwich glasses for use in front glass for automobiles, window glass for buildings, decorative glass, glass for the reflection or absorption of heat radiation and the like, and more particularly to a sandwich glass having excellent safety, durability, scuff resistance and penetration resistance.

2. Description of the Prior Art

In this type of the sandwich glass, various synthetic resins have hitherto been used as an intermediate layer. In such conventional sandwich glasses, however, there are scarcely those satisfying all of safety, durability, penetration resistance and scuff resistance. Particularly, even if the penetration resistance and scuff resistance are tentatively attained, it is more desirable to improve them.

In view of energy-saving, heat-absorbing or heat-reflecting glasses have recently been used as a window glass for usual houses or buildings. In the heat-absorbing glass, the glass itself or its surface is colored, while in the heat-reflecting glass, the surface of transparent or colored glass is provided with a thin layer of metal or metal oxide as a heat-reflecting layer.

However, not only the heat-absorbing and —reflecting glasses are very expensive, but also once they are broken, the broken glass pieces are scattered likewise the ordinary glass to cause a problem in view of the safety.

Furthermore, when a film for the reflection or absorption of heat radiation is affixed to the surface of the glass, the working is relatively simple and the effect on the prevention of the scattering of broken glass pieces is slightly developed. However, the film itself is poor in the durability, is apt to be peeled off and is low in the scuff resistance, so that it is required to replace the film with a new one every several years.

There have recently been popularized decorative glasses, wherein various designs such as drawings, pictures, photographs, letters and the like are applied to the surface of various window glasses or partition glasses. These decorative glasses are widely used as a window glass for the partition of bath room, child room and the like, glasses for skylight at a ceiling face, a display in shops or buildings, a show window, and further as a replacement for stained glass. In such a case, however, since the design is printed, applied or affixed to the surface of glass, there are caused the same drawbacks as in the aforementioned glass affixed with the heat-absorbing or —reflecting film, and particularly there is not a little problem in the durability and safety. Particularly, when the decorative glass is used for the partition of the bath room, since the atmosphere in the bath room is severe conditions of high temperature and high humidity, the design floats or peels off from the glass and also becomes discolored within 1-2 years. There are also the same drawbacks as in the decorative glass when a film printed with various designs is directly affixed to the glass surface.

Moreover, although it is possible either to affix a film including a colorant to glass surface for absorbing heat radiation, or to directly deposit a metal on the glass surface or affix a metal deposited film to the glass surface for providing an effect on the reflection of heat radiation or a conductivity, there are also caused the above drawbacks.

SUMMARY OF THE INVENTION

It is an object of the invention to provide sandwich glasses solving the above drawbacks.

According to the invention, there is the provision of a sandwich glass comprising two glass plates and a laminate interposed therebetween, said laminate consisting of at least two intermediate layers each composed of a crosslinking type polymer composition, and an organic resin film layer interposed between said intermediate layers.

In the preferred embodiments of the invention, each of the two glass plates is a heat-absorbing or —reflecting glass, the organic resin film layer is transparent and is wholly or partially provided with various designs, a part or whole of the film layer is colored for the absorption of heat radiation, and a metal or metal oxide is deposited on the surface of the film layer for providing the effect on the reflection of heat radiation or the conductivity.

DETAILED DESCRIPTION OF THE INVENTION

As the crosslinking type polymer composition used in the intermediate layer according to the invention, mention may be made of ethylene-acrylate (or methacrylate) copolymer crosslinked with metal ion, ethylene-methyl acrylate copolymer, ethylene-acrylic (or methacrylic) acid copolymer, ethylene-ethyl acrylate copolymer, partially saponified ethylene-vinyl acetate copolymer, carboxylate ethylene-vinyl acetate copolymer, organic peroxide containing ethylene-vinyl acetate copolymer, photosensitive composition consisting of (A) a high molecular weight substance modified with acrylic (or methacrylic) acid or the derivative thereof and having unsaturated double bonds in molecule and (B) a compound containing at least one acryloxy (or methacryloxy) group (Japanese Patent laid-open No. 55-90,445) and the like.

As the material of the organic resin film layer according to the invention, use may be made of polyester, polyvinyl chloride, polyvinylidene chloride, polyethylene, ethylene-vinyl acetate copolymer, saponified ethylene-vinyl acetate copolymer, polymethyl methacrylate, polyvinyl butyral, ethylene-ethyl acrylate copolymer, ethylene-methyl acrylate copolymer, ethylene-methacrylate copolymer crosslinked with metal ion, polystyrene, polyurethane, polycarbonate, cellophane and the like. In view of smoothness, surface gloss (it is required for forming a thin metal film by vapor deposition or the like), strength, workability, etc. of the film layer, the polyester film is most preferable.

According to the invention, the metal or metal oxide may be deposited on the film layer, for example, by vapor deposition, sputtering, ion plating or the like for providing the effect on the reflection of heat radiation or the conductivity, and includes indium oxide, chromium oxide, gold, vanadium, tin, cadmium oxide, silver, platinum, aluminum, copper, copper iodide, tin oxide, tin antimony oxide, titanium oxide and the like.

The adhesion between the intermediate layer and the organic resin film should be considered in the combination of the intermediate layers and the film layer according to the invetion. A safe sandwich glass is first obtained by sufficiently ensuring the adhesion between the glass plate and the intermediate layer and between the intermediate layer and the film layer, whereby a durability is guaranteed for a long time.

In this connection, the inventors have previously proposed a sandwich glass obtained by interposing ethylene-vinyl acetate copolymer containing a small amount of an organic peroxide as an intermediate layer between two glass plates and then thermosetting it (Japanese Patent laid-open No. 57-196,747). In this sandwich glass, however, the content of vinyl acetate in the ethylene-vinyl acetate copolymer is restricted to be within a range of 15-50% by weight. Because, when the content of vinyl acetate is less than 15%, the transparency is insufficient through the thermosetting at high temperature, while when it exceeds 50%, the transparency is good, but the modulus lowers and consequently the good penetration resistance can not be obtained.

According to the invention, sandwich glasses having a very excellent penetration resistance can be obtained without limiting the content of vinyl acetate in the ethylene-vinyl acetate copolymer by interposing an organic resin film between at least two intermediate layer each composed of an organic peroxide containing ethylene-vinyl acetate copolymer to form an intermediate laminate, and interposing the laminate between two glass plates, and then thermosetting the intermediate layers. In this case, the ethylene-vinyl acetate copolymer well adheres to the organic resin constituting the film in the thermosetting without substantially damaging the transparency, so that even if the content of vinyl acetate in the ethylene-vinyl acetate copolymer is increased, the good penetration resistance can be developed owing to the presence of the organic resin film interposed between the intermediate layers. That is, even when the content of vinyl acetate exceeds 50% by weight, the excellent penetration resistance can be obtained.

In addition, when polyester is used in the organic resin film, if the ethylene-vinyl acetate copolymer (abbreviated as EVA copolymer hereinafter) containing the organic peroxide is heat-treated at a temperature above the decomposition temperature of the organic peroxide, the EVA copolymer becomes transparent and is strongly affixed to the glass plates and the film, respectively.

Moreover, the intermediate layer of EVA copolymer is strongly affixed to a metal thin layer deposited on the organic resin film or various designs printed or coated on the film, so that the use of the EVA copolymer is most suitable for providing a safety sandwich glass.

As the organic peroxide used as a curing agent for the EVA copolymer in the manufacture of the sandwich glass according to the invention, use may be made of any compounds producing radicals by decomposition at a temperature above 100° C., preferably compounds having a decomposition temperature of not less than 70° C. under a half-life of 10 hours in view of the stability in the mixing. For instance, the organic peroxide includes 2,5-dimethylhexane-2,5-dihydroperoxide, 2,5-dimethyl-2,5-di(t-butylperoxy)hexane-3, di-t-butyl peroxide, t-butylcumyl peroxide, 2,5-dimethyl-2,5-di(t-butylperoxy)hexane, dicumyl peroxide, $\alpha,\alpha'$-bis(t-butylperoxyisopropyl)benzene, n-butyl-4,4'-bis(t-butylperoxy)valerate, 2,2-bis(t-butylperoxy)butane, 1,1-bis(t-butylperoxy)cylcohexane, 1,1-bis(t-butylperoxy)-3,3,5-trimethyl cyclohexane, t-butylperoxy benzoate, benzoyl peroxide and the like. The amount of the organic peroxide is sufficient to be not more than 5 parts by weight based on 100 parts by weight of the EVA copolymer.

In order to enhance the penetration resistance by increasing the initial modulus of the EVA copolymer as the intermediate layer in the sandwich glass according to the invention, an acryloxy or methacryloxy group-containing compound can be added to the EVA copolymer. As such a compound, there are most commonly used derivatives of acrylic or methacrylic acid, for example, esters and amides thereof. As an alcohol residue of such an ester, mention may be made of alkyl groups such as methyl group, ethyl group, dodecyl group, stearyl group, lauryl group and the like; cyclohexyl group, tetrahydrofurfuryl group, aminoethyl group, 2-hydroxyethyl group, 3-hydroxypropyl group, 3-chloro-2-hydroxypropyl group and so on. Further, there may similarly be used esters with polyfunctional alcohols such as ethylene glycol, triethylene glycol, polyethylene glycol and the like. A typical example of the amide is diacetone acrylamide.

In order to further enhance the adhesion between the EVA copolymer and the glass plate, a silane coupling agent may be added. As the silane coupling agent, mention may be made of $\gamma$-chloropropyl methoxysilane, vinyltrichlorosilane, vinyltriethoxysilane, vinyl-tris($\beta$-methoxyethoxy)silane, $\gamma$-methacryloxypropyl trimethoxysilane, $\beta$-(3,4-ethoxycyclohexyl)ethyltrimethoxysilane, $\gamma$-glycidoxypropyl trimethoxysilane, vinyltriacetoxysilane, $\gamma$-mercaptopropyl trimethoxysilane, $\gamma$-aminopropyl triethoxysilane, N-$\beta$-(aminoethyl)-$\gamma$-aminopropyl trimethoxysilane and the like.

In the sandwich glass according to the invention, the intermediate layers are strongly affixed to the glass plates and further strongly affixed to each other through the organic resin film as mentioned above. Accordingly, the sandwich glass is hard to be broken, and even if it is broken, the broken glass pieces are not scattered.

Moreover, according to the invention, the deposited metal thin layer, or the printing or coating surface of the design is not directly exposed to air and is shut to air, so that not only the scuff resistance is extremely excellent, but also there is very little possibility of changes of properties and color such as oxidation, discoloration and the like, caused by ultraviolet ray, heat or the like. There is, of course, no possibility of causing the corrosion, peeling and the like through water, solvent or the like.

The procedure for producing the sandwich glass according to the invention having many characteristics as mentioned above is roughly divided into two processes. In the first process, the intermediate layer, the film and the intermediate layer are laminated on the glass plate in turn. In the second process, the intermediate layer-film-intermediate layer are previously laminated by the adhesion, sticking, hot-melting or the like and then the laminate is interposed between two glass plates in the sandwiching step. In either of the above two processes, however, sandwich glasses having the desired performances can be obtained.

The following examples are given in illustration of the invention and are not intended as limitations thereof.

EXAMPLE 1

Two square sheets with a side of 305 mm (abbrviated as "square sheet" hereinafter) having a thickness of 0.4 mm were prepared by pressing a commercially available metal ion crosslinking type iomomer resin (made by Mitsui Poly Chemical Corporation, trade name; HAIMIRAN 1707) at 170° C.

Separately, a commercially available colored heat-absorbing film composed mainly of a polyester resin and having a thickness of 50μ was provided, on the upper and lower sides of which were laminated the above HAIMIRAN sheets as an intermediate layer. This laminate was interposed between two square glass plates with a side of 305 mm (abbreviated as "square glass plate" hereinafter) having a thickness of 3 mm and deaerated under vacuum in a rubber bag. The resulting glass assembly was heat-treated on a plate heated at 170° C. for about 30 minutes to obtain an air-free sandwich glass A.

In the resulting sandwich glass A were not observed wrinkles of the polyester film, distortion of pictures seen through the glass, and the like. And also, the sandwich glass A had appearance and heat-absorbing effect equal to those of a square glass plate B having a thickness of 3 mm and provided at its surface with the heat-absorbing film adhered through an adhesive, water or the like. In the latter glass B, small unevennesses were rather observed on the film surface due to the influence of the partially remaining water, air or foreign matter, resulting in the deterioration of the appearance. On the other hand, such a defect was not observed at all in the sandwich glass A according to the invention.

Furthermore, in order to estimate the level of impact resistance in the sandwich glass A, a sandwich glass C as a control was further produced by interposing the square intermediate layer sheet having a thickness of 0.8 mm between the square glass plates having a thickness of 3 mm and then heating them under vacuum.

With respect to each of six glasses A, B and C, the penetration resistance was compared with each other by dropping a steel ball having a weight of 2.25 kg from a height of 4 m onto each glass surface according to the impact test method of JIS R3212.

In all of the sandwich glasses A, the steel ball did not penetrate through the sandwich glass, and also a very small amount of the broken glass pieces was peeled off and fallen down. As to the glass C, however, the steel ball penetrated through the four glasses among the six glasses, and also a somewhat large amount of the broken glass pieces was peeled off. On the other hand, the steel ball penetrated through all of the six glasses B and a large amount of broken glass pieces were scattered.

EXAMPLE 2

According to the following table, a polymer composition D was prepared in a kneader at room temperature and a polymer composition E was prepared on a roll at a temperature of 130° C.

| Composition D | | Composition E | |
| --- | --- | --- | --- |
| Modified cis 1,4-polybutadiene* | 40 parts | Polyvinyl butyral resin** | 100 parts |
| Cycrohexyl methacrylate | 55 parts | Dibutyl phthalate | 20 parts |
| 2-hydroxyethyl methacrylate | 5 parts | | |
| γ-methacryloxy propyl trimethoxy silane | 0.3 parts | (Plasticizer) | |
| Benzoinepropyl ether | 1 part | | |

*one methacrylic acid was added to BR-01 made by Japan Synthetic Rubber Co., Ltd. per molecular weight of 3,000
**made by Sekisui Kagaku K.K. (trade name: Esreck BMS)

[MANUFACTURE OF SANDWICH GLASS]

Polymer composition D

A proper amount of the polymer composition D was placed between two release papers at its central portion and pressed at 70° C. under such a state that a spacer with a thickness of 0.3 mm was arranged on the circumference between the two release papers, whereby plural square sheets having a thickness of 0.4 mm were obtained.

Each of the above square sheets released from the release paper was contact-bonded to each of upper and lower sides of a heat-reflecting film having a thickness of 50μ and made of polyester resin (aluminum thin layer was vapor deposited) so as not to include air bubbles. Then, the resulting laminate was interposed between two square glass plates having a thickness of 3 mm so as not to include air bubbles.

An ultraviolet ray was irradiated to one surface of the resulting glass assembly by means of 400 W mercury vapor lamp from a distance of 15 cm for 10 minutes to cure the polymer composition, whereby a sandwich glass D was obtained.

Similarly, only a square sheet having a thickness of 0.8 mm and composed of the polymer composition D was interposed between the two glass plates without the heat-reflecting film in the same manner as described above to obtain a sandwich glass D'.

Polymer composition E

Several square sheets each composed of the polymer composition E and having a thickness of 0.4 mm were previously provided by press-molding of the polymer composition.

Each of the above square sheets was laminated one by one on both upper and lower sides of a heat-reflecting film having a thickness of 50μ (the same as in the polymer composition D). The resulting laminate was interposed between two square glass plates having a thickness of 3 mm and then left to stand in an oven at 100° C. for 30 minutes while being deaerated under vacuum in a rubber bag, and then heated under a pressure in an autoclave at 145° C. for 20 minutes to obtain a sandwich glass E.

[PENETRATION RESISTANCE TEST]

A steel ball having a weight of 2.25 kg was dropped from a height of 4 m according to the impact test method of JIS R3212 for the evaluation of the penetration resistance.

The results were as follows.

That is, in all of six sandwich glasses D (according to the invention), the steel ball did not penetrate through the sandwich glass. On the other hand, in the five sandwich glasses among the six sandwich glasses D', the steel ball penetrated through the sandwich glass.

[DURABILITY TEST]

With respect to the sandwich glasses D and E, a cooling-heating cycle test as shown in the following was carried out for 100 hours.

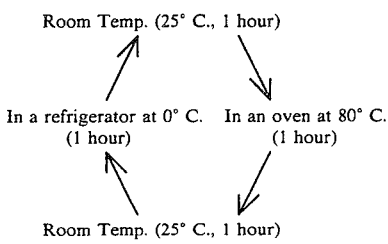

As a result, a considerable peeling phenomenon was observed between the heat-reflecting film and the intermediate layer in the sandwich glass E, while in the sandwich glass D was observed no extraneous phenomenon.

In order to examine the cause on the above results, a part of each of the sandwich glasses D and E was cut out and subjected to a peeling test. As a result, in the sandwich glass E, the peeling easily occurred at the boundary between the polyester film and the intermediate layer sheet, while in the sandwich glass D, all layers were strongly adhered to each other and consequently the peeling was impossible.

EXAMPLE 3

On the upper and lower sides of a color gravure printed polyester film having a thickness of 50µ were laminated two sheets each composed of the polymer composition D of Example 2, from which a decorative sandwich glass having no defects such as inclusion of air and the like was produced in the same manner as described in Example 2

A part of this sandwich glass was subjected to an accelerated exposure for 500 hours in a sunshine weatherometer (made by Suga Shikenki K.K.).
Conditions:
Due cycle
Black panel temperature: 63° C.
Bath temperature: 40° C.
Use of sunshine carbon.

On the other hand, the other part of the decorative sandwich glass was subjected to an outdoor exposure for one year.

In any case of the acclerated exposure and outdoor exposure tests, the bubbling, peeling, color degradation, color change and the like were not observed at all, and consequently the same color tone and appearance as those of the original sample were maintained.

EXAMPLE 4

The adhesion between the ethylene-vinyl acetate copolymer and the polyester resin film was measured as follows.

That is, 100 parts by weight of a commercially available ethylene-vinyl acetate copolymer (the content of vinyl acetate; 26%) was compounded with 1 part by weight of dicumyl peroxide as an organic peroxide and 0.3 part by weight of γ-methacryloxypropyl trimethoxy silane as a silane coupling agent. The resulting mixture was homogeneously dispersed by means of a V type mixer and then extruded through T die having a lip width of 400 mm in an extruder for plastic with a cylinder diameter of 40 mm (preset temperature 80°–100° C.) to obtain an EVA sheet having a thickness of 0.4 mm.

A commercially available polyester resin film having a thickness of 50µ was interposed between the above two EVA sheets and heated in an oven at 150° C. for 40 minutes while being deaerated under vacuum in a rubber bag to obtain a sample for adhesion test.

The resulting sample was cut into a width of 1 inch and then the adhesion was measured by peeling at 180° C. using a peeling test machine of Shimazu Auto Graph IS-5000 made by Shimazu Seisakusho to obtain an adhesive force value of 6 kg/inch.

That is, it was confirmed that the adhesion between the ethylene-vinyl acetate copolymer and the polyester resin film was very good.

EXAMPLE 5

Two EVA sheets each having a thickness of 0.2 mm were extruded from two extruders in the same manner as described in Example 4, respectively, and then a polyester resin film having a thickness of 50µ and provided with a deposited aluminum thin layer was interposed therebetween. The resulting laminate was cut into square sheet (305 mm×305 mm), which was interposed between two square float glass plates. The resulting glass assembly was deaerated in a rubber bag under vacuum and then left to stand in an oven at 150° C. for 40 minutes as it was to obtain a sandwich glass.

In the resulting sandwich glass, the inclusion of air was not observed at all and the effect on the reflection of heat radiation was equal to that of a heat-reflecting glass provided with a metal film directly deposited thereon.

The fracture state of the above heat-reflecting safety sandwich glass was observed by dropping a steel ball having a weight of 2.25 kg from a height of 2 m or 1.5 m onto the glass surface according to the impact test method of JIS R3025.

In both cases of dropping from the heights of 2 m and 1.5 m, the steel ball did not penetrate through the sandwich glass. Incidentally, in case of dropping from the height of 2 m, a crack of 70 mm in length was produced, but in case of dropping from the height of 1.5 m, no crack was produced.

COMPARATIVE EXAMPLE 1

Two EVA sheets having a thickness of 0.2 mm were superposed one upon the other and interposed between two float glass plates having a thickness of 3 mm, after which the same procedure as described in Example 5 was repeated to obtain a sandwich glass.

When the steel ball having a weight of 2.25 kg was dropped from a height of 1.5 m onto the surface of the sandwich glass according to the impact test method of JIS R3025, it completely penetrated through the glass after the dropping was repeated two times.

EXAMPLE 6

An EVA sheet with a thickness of 0.4 mm was extruded in the same manner as described in Example 4 and cooled by passing between an embossing roll and a rubber roll, whereby a proper embossing pattern was formed on both surfaces of the sheet.

Between two sheets squarely cut out from the above EVA sheet was interposed a colored heat-absorbing film of polyester resin with a thickness of 50µ and then the resulting laminate was interposed between two square float glass plates having a thickness of 3 mm. The resulting glass assembly was deaerated in a rubber bag under vacuum and then left to stand in an oven at 150° C. for 40 minutes to obtain an air-free sandwich glass.

The thus obtained sandwich glass according to the invention had no inclusion of air, no wrinkle on the film and no distortion of pictures seen through the glass, and was equal in the effect on the absorption of heat radiation to a glass coated with a colored sheet.

With respect to the resulting six sandwich glasses, the steel ball having a weight of 2.25 kg was dropped onto each glass surface from a height of 4 m to measure the penetration resistance, and as a result, the steel ball did not penetrate through the five sandwich glasses.

COMPARATIVE EXAMPLE 2

Two EVA sheets obtained in the same manner as described in Example 4 were interposed between the two float glass plates in the same manner as described in Example 6 to obtain a sandwich glass.

With respect to the resulting six sandwich glasses, the steel ball having a weight of 2.25 kg was dropped from a height of 4 m onto each glass surface to measure the penetration resistance, and as a result, the steel ball penetrated through all of sandwich glasses.

EXAMPLE 7

On both upper and lower sides of a color gravure printed polyester film were laminated the same EVA sheets as in Example 4 and then the resulting laminate was interposed between two glass plates to obtain the same decorative sandwich glass having no defects such as inclusion of air and the like as in Example 4.

A part of this sandwich glass was subjected to an accelerated exposure for 500 hours in a sunshine weatherometer (made by Suga Shikenki K.K.).

Conditions:
Due cycle
Black panel temperature: 63° C.
Bath temperature: 40° C.
Use of sunshine carbon.

On the other hand, the other part of the decorative sandwich glass was subjected to an outdoor exposure for one year.

In both cases of the accelerated exposure and outdoor exposure tests, the bubbling, peeling, color degradation, color change and the like were not observed at all, and the same color tone and appearance as in the original sample were maintained.

EXAMPLE 8

Onto a surface of a commercially available polyester film (thickness 50$\mu$) was deposited a thin layer of indium oxide ($In_2O_3$) and cut in a size larger than that of the glass plate to be laminated.

On the upper and lower sides of the film were laminated the two sheets obtained in Example 4 and then the resulting laminate was interposed between two glass plates, after which the same procedure as descrbed in Example 5 was repeated to obtain an air-free electrically conductive sandwich glass F.

Separately, a sandwich glass G was obtained in the same manner as described above, except that indium oxide was not deposited on polyester film.

The both sandwich glasses were kept at a temperature of 0° C. in a refrigerator for 30 minutes and then taken out therefrom. In the sandwich glass A, electrodes were quickly set at the two side portions of the $In_2O_3$ deposited polyester film protruding from the glass, and the application of electric current was continued under a constant voltage (24 V).

Although, immediately after both sandwich glasses F and G were taken out from the refrigerator, a mist based on a waterdrop was produced over the whole surface of both glasses, the mist very quickly disappeared in the sandwich glass F as compared with the sandwich glass G.

From the above result, it is obvious that the sandwich glass according to the invention has a suitability as a safety glass for de-misting.

What is claimed is:

1. A sandwich glass comprising two glass plates and a laminate interposed therebetween, said laminate consisting of (A) at least two intermediate layers each composed of, an ethylene-vinyl acetate copolymer containing an organic peroxide and (B) an organic resin film layer interposed between said intermediate layers.

2. The sandwich glass according to claim 1, wherein said glass plate is a glass for the reflection or absorption of heat radiation.

3. The sandwich glass according to claim 1, wherein said organic resin film is transparent and is wholly or partially provided with various designs.

4. The sandwich glass according to claim 1, wherein said organic resin film is wholly or partially colored for the absorption of heat radiation.

5. The sandwich glass according to claim 1, wherein a thin layer of a metal or metal oxide is deposited on the surface of said organic resin film for providing an effect on the reflection of heat radiation and a conductivity.

6. The sandwich glass according to claim 5, wherein the formation of said thin film of metal or metal oxide is carried out by vapor deposition, sputtering or ion plating.

7. The sandwich glass according to claim 5 or 6, wherein said metal or metal oxide is selected from indium oxide, chromium oxide, gold, vanadium, tin, cadmium oxide, silver, platinum, aluminum, copper, copper iodide, tin oxide, tin antimony oxide and titanium oxide.

* * * * *